United States Patent
Jiang

(10) Patent No.: US 11,076,429 B2
(45) Date of Patent: Jul. 27, 2021

(54) METHOD AND APPARATUS FOR ACQUIRING SYSTEM INFORMATION, AND METHOD AND APPARATUS FOR TRANSMITTING SYSTEM INFORMATION

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/786,675

(22) Filed: Feb. 10, 2020

(65) Prior Publication Data

US 2020/0187267 A1 Jun. 11, 2020

Related U.S. Application Data

(63) Continuation of application No. PCT/CN2017/097110, filed on Aug. 11, 2017.

(51) Int. Cl.
*H04W 76/27* (2018.01)
*H04W 74/08* (2009.01)
(Continued)

(52) U.S. Cl.
CPC ....... *H04W 74/0833* (2013.01); *H04W 16/28* (2013.01); *H04W 56/001* (2013.01);
(Continued)

(58) Field of Classification Search
CPC ....... H04W 4/06; H04W 16/28; H04W 48/10; H04W 48/12; H04W 48/14;
(Continued)

(56) References Cited

U.S. PATENT DOCUMENTS

2011/0039499 A1* 2/2011 Zhang ............... H04W 74/0833
455/67.11
2013/0064226 A1 3/2013 Dinan
(Continued)

FOREIGN PATENT DOCUMENTS

CN 104255079 A 12/2014
CN 106714272 A 5/2017
(Continued)

OTHER PUBLICATIONS

International Search Report to PCT Application No. PCT/CN2017/097110, dated May 2, 2018, (5p).
(Continued)

*Primary Examiner* — Jean A Gelin
(74) *Attorney, Agent, or Firm* — Arch & Lake LLP

(57) ABSTRACT

A method, a user equipment, and a base station are provided for acquiring and transmitting system information. The method is applicable to the user equipment, and includes: a message of random access is transmitted to a base station, where the message of random access includes first request information for requesting system information; first instruction information transmitted by the base station according to the first request information is received, wherein the first instruction information instructs the user equipment to enter a connected state for receiving the system information; a communication connection is established with the base station; and first radio resource control information transmitted by the base station is received, and the system information is extracted from the first radio resource control information.

8 Claims, 17 Drawing Sheets

(51) Int. Cl.
*H04W 76/10* (2018.01)
*H04W 16/28* (2009.01)
*H04W 56/00* (2009.01)
*H04W 72/04* (2009.01)
*H04W 84/04* (2009.01)

(52) U.S. Cl.
CPC ......... *H04W 72/046* (2013.01); *H04W 76/10* (2018.02); *H04W 76/27* (2018.02); *H04W 84/042* (2013.01)

(58) Field of Classification Search
CPC . H04W 56/001; H04W 72/046; H04W 72/14; H04W 74/006; H04W 74/0833; H04W 76/10; H04W 76/27; H04W 84/042; H04L 12/1868; H04L 12/1877; H04L 5/0007; H04L 5/0053; H04L 5/0078
See application file for complete search history.

(56) References Cited

U.S. PATENT DOCUMENTS

| | | | |
|---|---|---|---|
| 2013/0077551 A1* | 3/2013 | Lo | H04W 16/14 370/312 |
| 2013/0077584 A1* | 3/2013 | Lee | H04W 74/0833 370/329 |
| 2014/0056244 A1* | 2/2014 | Frenne | H04W 72/1289 370/329 |
| 2014/0295836 A1* | 10/2014 | Frenger | H04W 48/16 455/434 |
| 2015/0029875 A1 | 1/2015 | Zhu et al. | |
| 2015/0304909 A1* | 10/2015 | Yoshimoto | H04W 52/34 370/331 |
| 2016/0234736 A1 | 8/2016 | Kubota et al. | |
| 2017/0086131 A1* | 3/2017 | Gupta | H04W 36/0061 |
| 2017/0111886 A1 | 4/2017 | Kim et al. | |
| 2017/0251500 A1* | 8/2017 | Agiwal | H04W 48/12 |
| 2017/0311290 A1* | 10/2017 | Adjakple | H04W 36/00 |
| 2018/0049159 A1 | 2/2018 | Gu et al. | |
| 2018/0063720 A1* | 3/2018 | Ode | H04W 72/085 |
| 2018/0070237 A1* | 3/2018 | Cho | H04W 72/048 |
| 2018/0270873 A1* | 9/2018 | Cho | H04W 72/0446 |
| 2018/0359653 A1* | 12/2018 | Svedman | H04W 24/10 |
| 2019/0174554 A1* | 6/2019 | Deenoo | H04W 76/27 |
| 2019/0223082 A1* | 7/2019 | He | H04W 4/06 |
| 2020/0029180 A1* | 1/2020 | Lei | H04W 4/06 |
| 2020/0413439 A1* | 12/2020 | Kim | H04W 48/14 |

FOREIGN PATENT DOCUMENTS

| | | |
|---|---|---|
| CN | 106793000 A | 5/2017 |
| CN | 106797604 A | 5/2017 |
| CN | 106954259 A | 7/2017 |
| CN | 107018497 A | 8/2017 |
| CN | 110301155 A | 10/2019 |

OTHER PUBLICATIONS

3GPP TS 36321 V15.4.0 (Dec. 2018) Technical Specification, 3rd Generation Partnership Project; Technical Specification Group Radio Access Network; Evolved Universal Terrestrial Radio Access (E-UTRA); Medium Access Control (MAC) Protocol specifcation (Release 15), (131p).

3GPP TS 36.331 V15.4.0 (Dec. 2018) Technical Specification, 3rd Generation Partnership Project; Technical Specification Group Radio Access Network; Evolved Universal Terrestrial Radio Access (E-UTRA); Radio Resource Control (RRC); Protocol specification (Release 15), (932p).

State Intellectual Property Office of the People's Republic of China, Office Action and Search Report Issued in Application No. 201780001383.6, dated Apr. 1, 2021, (33p). (Submitted with Machine Translation).

ZTE, ZTE Microelectronics,"Consideration on the Other SI delivery in NR",3GPP TSG-RAN WG2 Meeting #95bis, Kaohsiung, R2-166343, Oct. 10-14, 2016, (6p).

* cited by examiner

METHOD AND APPARATUS FOR ACQUIRING SYSTEM INFORMATION, AND METHOD AND APPARATUS FOR TRANSMITTING SYSTEM INFORMATION

CROSS REFERENCE TO RELATED APPLICATIONS

The present application is a continuation application of PCT Application No. PCT/CN2017/097110, filed on Aug. 11, 2017, which is incorporated herein by reference in its entirety.

TECHNICAL FIELD

The present disclosure relates to the field of communication technology, and in particular, to a method of acquiring system information, a method of transmitting system information, a user equipment, and a base station.

BACKGROUND 5G system information transmitted from a base station to user equipment includes minimum system information and other system information. For the minimum system information, it is transmitted to the user equipment by broadcast. For the other system information, some of the system information is transmitted to the user equipment in an on-demand manner, that is, transmitted to the user equipment upon receiving a request from a user, and some of the system information is transmitted to the user equipment by broadcast.

When the user equipment is in a non-connected state, after the user equipment requests the above-mentioned other system information from the base station, the base station can transmit other system information requested by the user equipment to the user equipment. However, since the base station cannot accurately determine quality of a signal to be received by the user equipment which is in the non-connected state, the beam signal sent to the user equipment cannot be adjusted properly (a 5G base station transmits signals to the user equipment by means of beam sweeping). As a result, a lot of resources in the air interface may be occupied to transmit the other system information to the user equipment.

SUMMARY

The present disclosure provides a method of acquiring system information, a method of transmitting system information, a user equipment, a base station, and a computer-readable storage medium, to solve the drawbacks in the related technology.

According to a first aspect of the present disclosure, a method of acquiring system information is provided, which may be applied to user equipment. The method comprises: transmitting a message of random access to a base station, wherein the message of random access includes first request information for requesting the system information; receiving first instruction information, which is transmitted by the base station according to the first request information, wherein the first instruction information instructs the user equipment to enter a connected state for receiving the system information; establishing a communication connection with the base station; and receiving first radio resource control information transmitted by the base station, and extracting the system information from the first radio resource control information.

According to a second aspect of the present disclosure, a method of transmitting system information is provided. The method includes: receiving a message of random access from a user equipment, wherein the message of random access includes first request information for requesting the system information; transmitting first instruction information to the user equipment according to the first request information, wherein the first instruction information instructs the user equipment to enter a connected state for receiving the system information; establishing a communication connection with the user equipment so that the user equipment enters the connected state; and transmitting first radio resource control information to the user equipment, wherein the first radio resource control information includes the system information.

According to a third aspect of the present disclosure, a user equipment is provided. The user equipment comprises: one or more processors; a non-transitory storage coupled to the one or more processors; and a plurality of programs stored in the non-transitory storage that, when executed by the one or more processors, cause the user equipment to perform acts comprising: transmitting a message of random access to a base station, wherein the message of random access comprises first request information for requesting system information; receiving first instruction information transmitted by the base station according to the first request information, wherein the first instruction information instructs the user equipment to enter a connected state for receiving the system information; establishing a communication connection with the base station; and receiving first radio resource control information transmitted by the base station, and extracting the system information from the first radio resource control information.

According to a fourth aspect of the present disclosure, a base station is provided. The base station comprises: one or more processors; a non-transitory storage coupled to the one or more processors; and a plurality of programs stored in the non-transitory storage that, when executed by the one or more processors, cause the base station to perform acts comprising: receiving a message of random access from a user equipment, wherein the message of random access comprises first request information for requesting system information; transmitting first instruction information to the user equipment according to the first request information, wherein the first instruction information instructs the user equipment to enter a connected state for receiving the system information; establishing a communication connection with the user equipment so that the user equipment enters the connected state; and transmitting first radio resource control information to the user equipment, wherein the first radio resource control information comprises the system information.

It is to be understood that the above general descriptions and the below detailed descriptions are merely exemplary and explanatory, and are not intended to limit the present disclosure.

BRIEF DESCRIPTION OF THE DRAWINGS

To describe the technical solutions in examples of the present disclosure or in the prior art more clearly, drawings required in descriptions of the examples of the present disclosure or the prior art will be briefly introduced below. It is apparent that the drawings described below are merely examples of the present disclosure and other drawings may be obtained by those of ordinary skill in the art based on these drawings in the examples of the present disclosure.

DETAILED DESCRIPTION OF THE EMBODIMENTS

Figure 1:
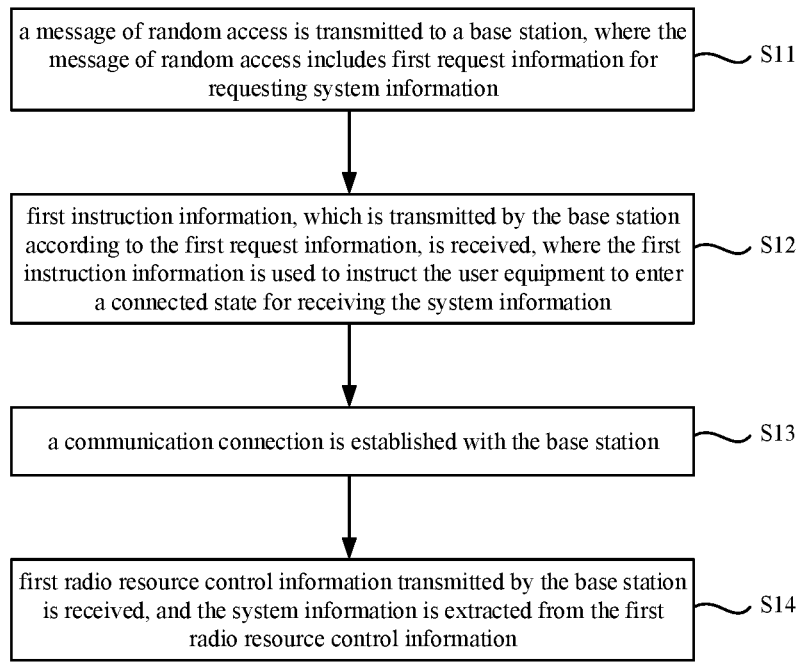
FIG. 1 is a schematic flowchart illustrating a method of acquiring system information according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The technical solutions provided by the examples of the present disclosure may include the following beneficial effects.

It can be seen from the above examples that, in the present disclosure, when a user equipment in a non-connected state requests system information from a base station through a message of random access, the user equipment may receive a first instruction information sent by the base station, and according to the first instruction information, the user equipment may establish communication with the base station and enter a connected state. After the user equipment enters the connected state, information such as quality parameters of the downlink signal for the base station can be reported to the base station, so that the base station may accurately determine quality of a signal received by the user equipment, and properly adjust a beam signal sent to the user equipment. Thus, without occupying a lot of resources in the air interface, the system information requested by the user equipment can be transmitted to the user equipment.

For a user equipment in a connected state, when it requests uplink synchronization from the base station through the message of random access, the user equipment may also request the system information from the base station at the same time, thereby eliminating the need to request the system information by sending an additional request to the base station, which is beneficial for reducing power consumption of the user equipment.

FIG. 1 is a schematic flowchart illustrating a method of acquiring system information according to an example. The method of acquiring system information shown in this example may be applicable to a user equipment, for example, a mobile phone or a tablet computer that may communicate with a base station, where the base station may be a 5G base station.

As shown in FIG. 1, the method of acquiring system information in this example may include the following steps.

At step S11, a message of random access is transmitted to a base station, where the message of random access includes first request information for requesting system information.

In another example, the user equipment may be a user equipment in a non-connected state, for example, a user equipment in an idle state, or a user equipment in an inactive state. Or the user equipment may also be a user equipment in a connected state.

In another example, the system information may be other system information acquired in an on-demand manner.

At step S12, first instruction information, which is transmitted by the base station according to the first request information, is received, where the first instruction information is used to instruct the user equipment to enter a connected state for receiving the system information.

At step S13, a communication connection is established with the base station.

In another example, for a user equipment in a non-connected state, the user equipment may send a connection establishment request to a base station to establish a communication connection with the base station, thereby entering a connected state. For a user equipment that is already in a connected state, since the user equipment is already in a connected state, and the message of random access is generally used during a random access phase for interacting between the user equipment and the base station, the user equipment which is already in the connected state generally cannot transmit the message of random access. While for a user equipment out of synchronization in uplink, since it loses synchronization when transmitting information to the base station, the user equipment may request synchronization by transmitting the message of random access to the base station, that is, for the user equipment in the connected state, when performing step S13, the user equipment may request synchronization by transmitting the message of random access to the base station, and then a synchronized communication connection is established with the base station.

At step S14, first radio resource control information (specifically, signaling) transmitted by the base station is received, and the system information is extracted from the first radio resource control information.

In another example, when a user equipment in a non-connected state requests system information from a base station through a message of random access, the user equipment may receive first instruction information sent by the base station, and according to the first instruction information, the user equipment may establish communication with the base station and enter a connected state. After the user equipment enters the connected state, information such as quality parameters of the downlink signal for the base station may be reported to the base station, so that the base station may accurately determine quality of a signal received by the user equipment and properly adjust a beam signal sent to the user equipment. Thus, without occupying a lot of resources in the air interface, the system information requested by the user equipment may be transmitted to the user equipment.

For a user equipment in the connected state, when it requests uplink synchronization from the base station through the message of random access, the user equipment may also request the system information from the base station at the same time, thereby eliminating the need to request the system information by sending an additional request to the base station, which is beneficial for reducing power consumption of the user equipment.

In another example, the message of random access is a first message of random access, and the first message of random access includes the first request information.

In another example, the first message of random access includes a preamble of the random access, and further includes the first request information.

Figure 2:
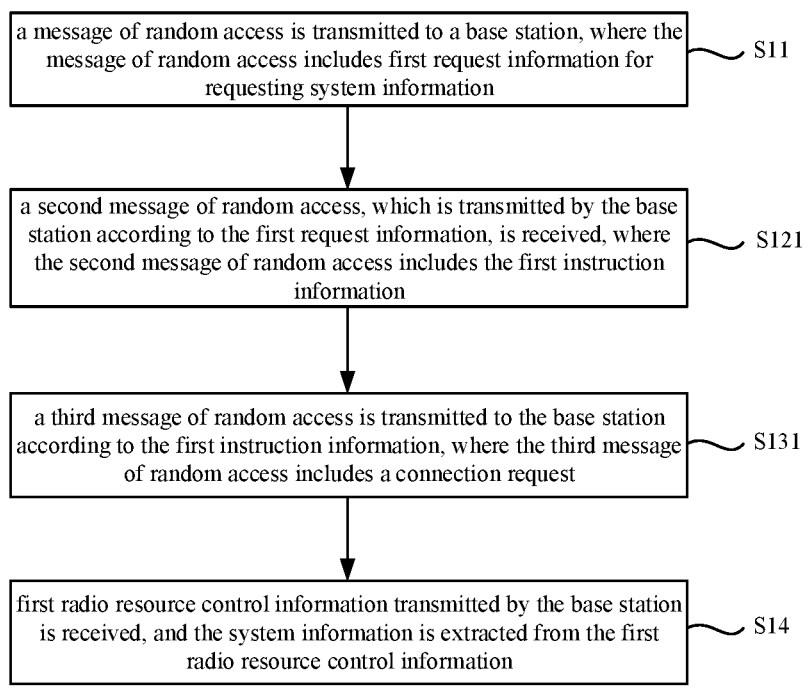
FIG. 2 is a schematic flowchart illustrating a method of acquiring system information according to another example.

FIG. 2 is a schematic flowchart illustrating a method of acquiring system information according to another example. As shown in FIG. 2, based on the example shown in FIG. 1, when the user equipment is in a non-connected state, receiving the first instruction information transmitted by the base station according to the first request information includes: at step S121, a second message of random access, which is transmitted by the base station according to the first request information, is received, where the second message of random access includes the first instruction information; establishing the communication connection with the base station includes: at step S131, a third message of random access is transmitted to the base station according to the first instruction information, where the third message of random access includes a connection request.

In another example, if the user equipment requests the system information from the base station through the first message of random access, since the message of random access is sent in sequence between the user equipment and the base station, that is, after one side sends a n-th message of random access, the other side feeds back a (n+1)-th message of random access based on the n-th message, where n is an integer greater than 0, upon receiving the first message of random access, the base station feeds back the second message of random access to the user equipment, and the first instruction information is carried on the second message of random access. Thus, the base station does not need to send the instruction information separately, which is beneficial for reducing the resource consumption of the base station.

In another example, upon receiving the second message of random access, the user equipment may send the third message of random access to the base station, where the third message of random access carries the connection request. Therefore, the user equipment does not need to send a connection request separately, which is beneficial for reducing the power consumption of the user equipment.

Figure 3:
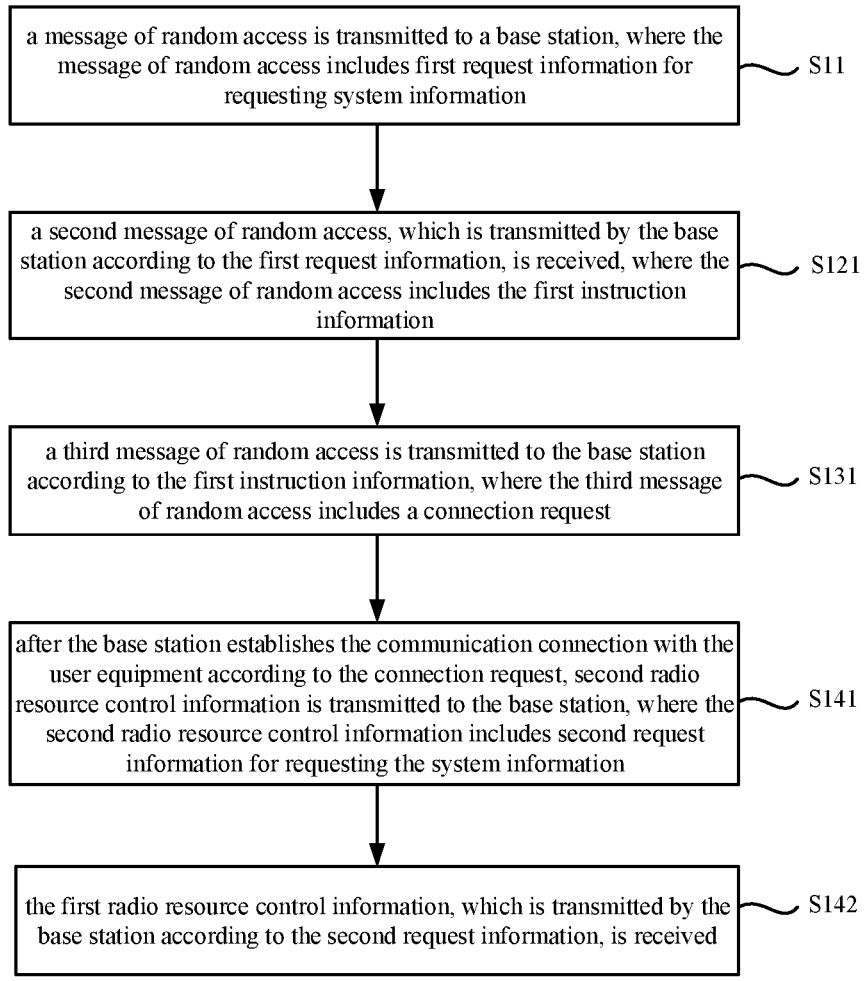
FIG. 3 is a schematic flowchart illustrating a method of acquiring system information according to another example.

FIG. 3 is a schematic flowchart illustrating method of acquiring system information according to another example. As shown in FIG. 3, based on the example shown in FIG. 2, receiving the first radio resource control information transmitted by the base station includes the following steps.

At step S141, after the base station establishes the communication connection with the user equipment according to the connection request, second radio resource control information is transmitted to the base station, where the second radio resource control information includes second request information for requesting the system information.

At step S142, the first radio resource control information, which is transmitted by the base station according to the second request information, is received.

In another example, after the base station establishes the communication connection with the user equipment according to the connection request, the user equipment enters the connected state. According to provisions of relevant protocols in 5G communication, for a user equipment in the connected state, the system information may be requested through radio resource control information (specifically, it may be signaling). Therefore, after entering the connected state, the user equipment may be set to send the second radio resource control information carrying the second request information, to request the above system information, which ensures that the communication process meets the protocol requirements.

Figure 4:
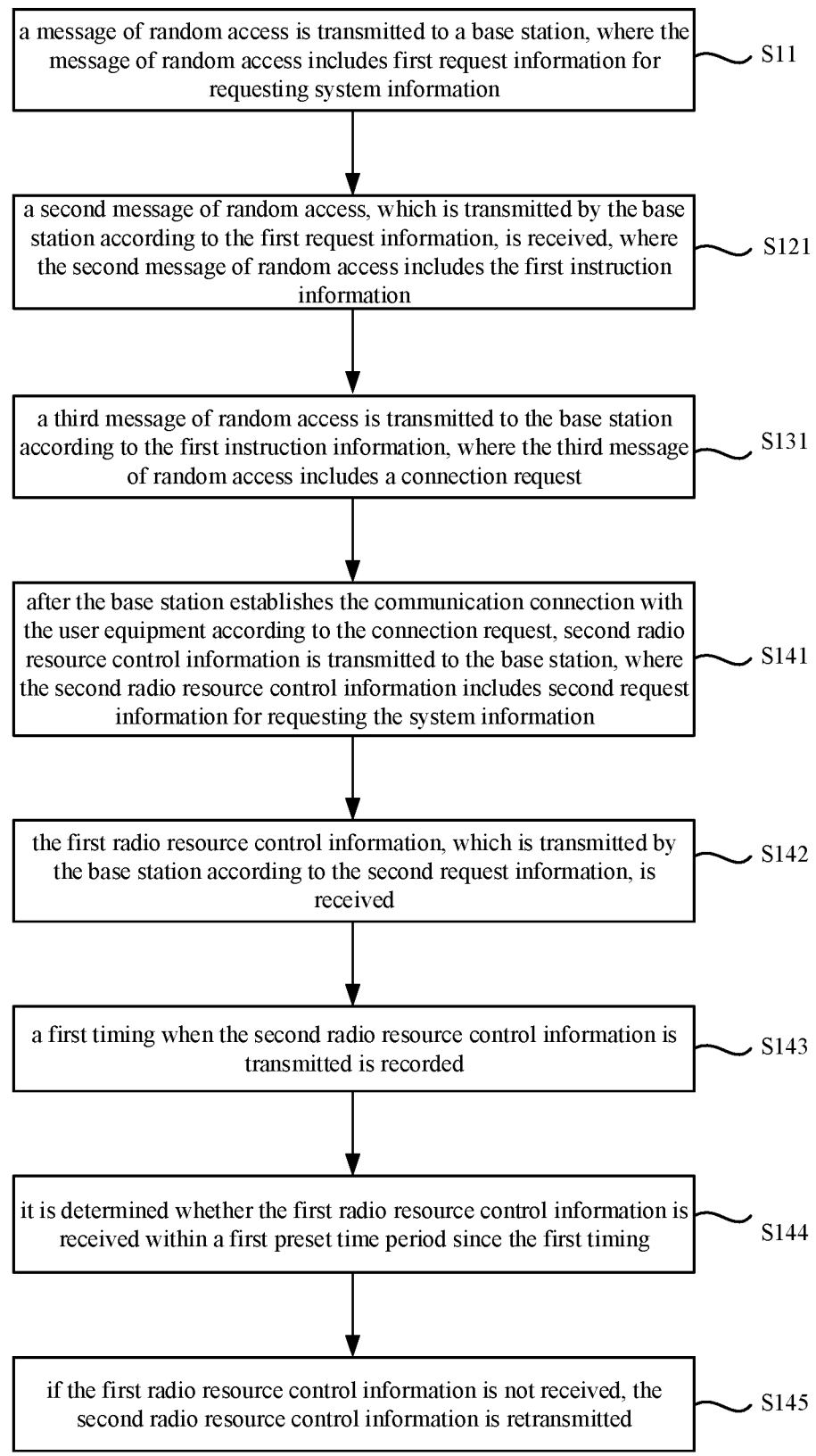
FIG. 4 is a schematic flowchart illustrating a method of acquiring system information according to another example.

FIG. 4 is a schematic flowchart illustrating a method of acquiring system information according to another example. As shown in FIG. 4, based on the example shown in FIG. 3, the method further includes the following steps.

At step S143, a first timing when the second radio resource control information is transmitted is recorded.

At step S144, it is determined whether the first radio resource control information is received within a first preset time period since the first timing.

At step S145, if the first radio resource control information is not received, the second radio resource control information is retransmitted.

In another example, when the user equipment transmits the second radio resource control information to the base station, the first timing when the user equipment performs this operation may be recorded, and it may be further determined whether the first radio resource control information is received within the first preset time period since the first timing. If the first radio resource control information sent by the base station is not received, it may be determined that the base station did not send the first radio resource control information due a reason such as the second radio resource control information did not arrived at the base station, the second radio resource control information was subjected to interference, the base station was busy, or the like. Thus, the user equipment may retransmit the second radio resource control information, to ensure that the system information may be acquired timely.

Figure 5:
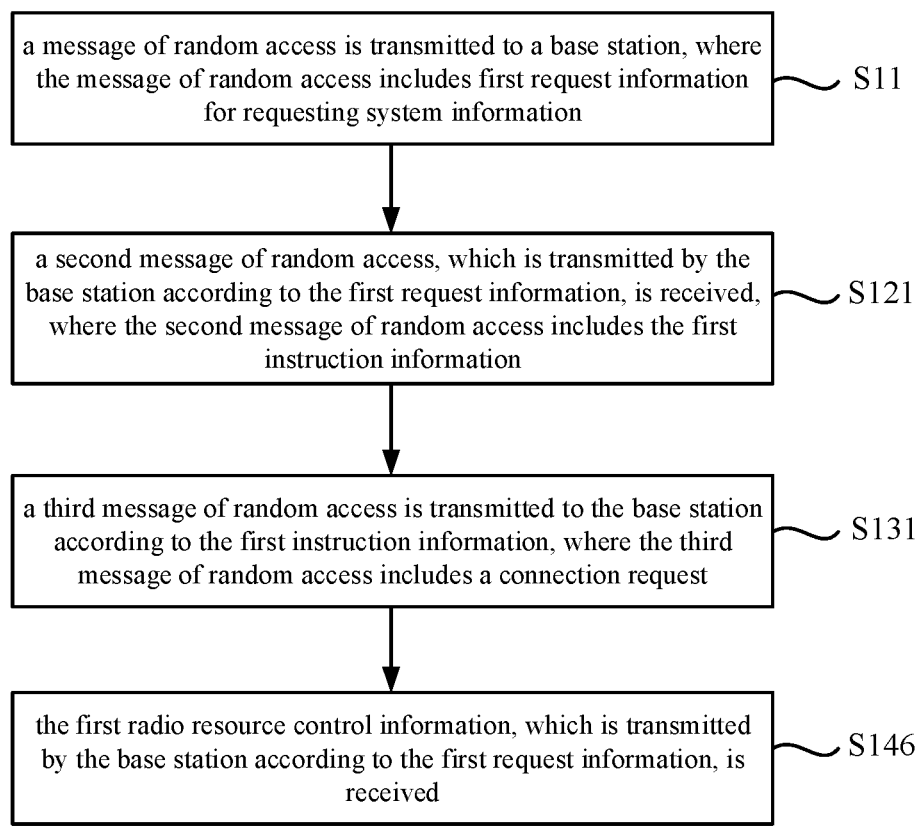
FIG. 5 is a schematic flowchart illustrating a method of acquiring system information according to another example.

FIG. 5 is a schematic flowchart illustrating a method of acquiring system information according to another example. As shown in FIG. 5, based on the example shown in FIG. 2, receiving the first radio resource control information transmitted by the base station includes: at step S146, the first radio resource control information, which is transmitted by the base station according to the first request information, is received.

Based on the examples shown in FIG. 3 and FIG. 4, after the user equipment is in the communication connection with the base station, the user equipment acquires the system information by sending the second request information to the base station. In addition, based on the example of FIG. 5, after the user equipment is in communication connection with the base station, the user equipment may wait for the base station to transmit the first radio resource control information carrying the system information according to the first request information. The specific receiving method may be selected according to actual needs.

Figure 6:
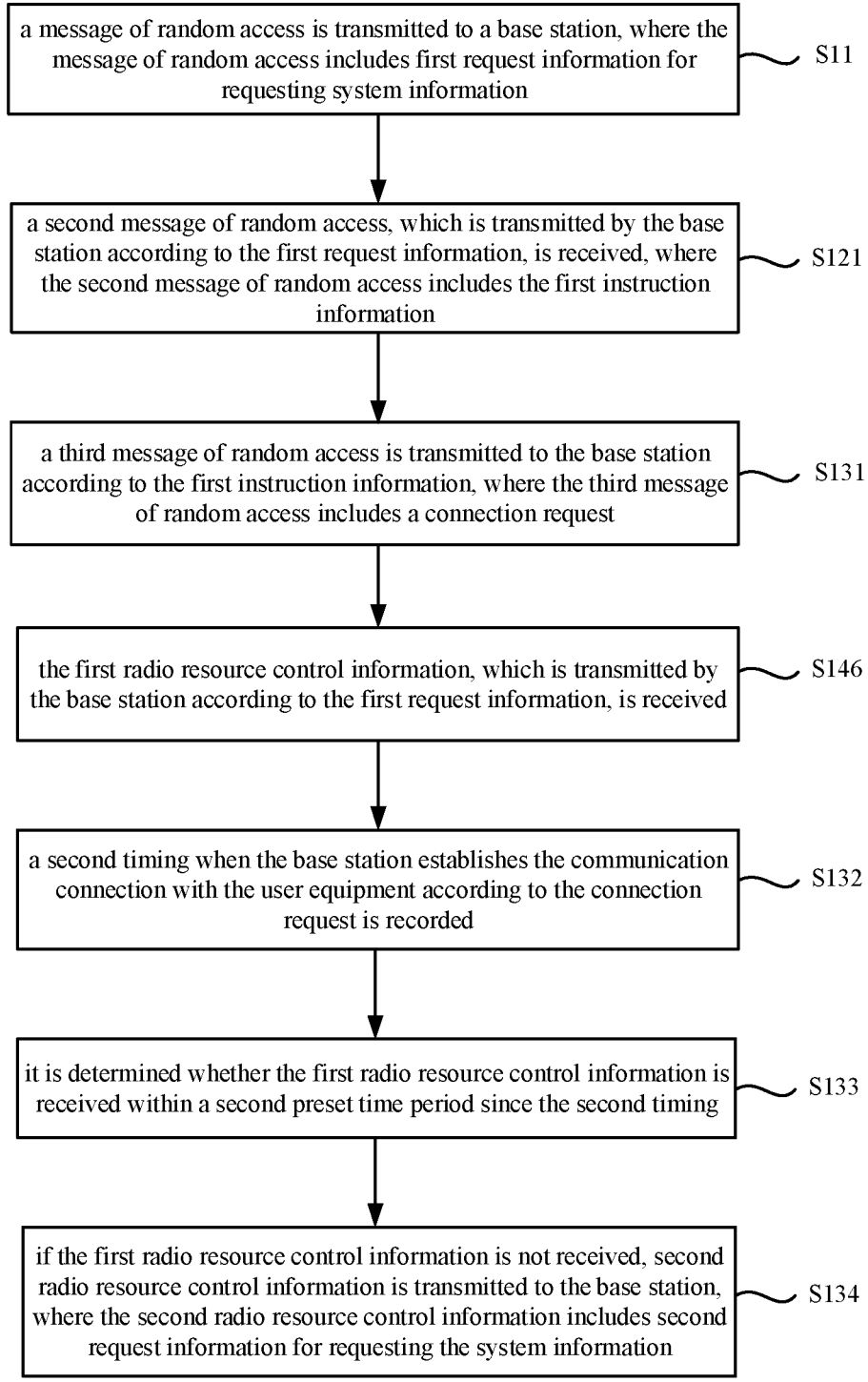
FIG. 6 is a schematic flowchart illustrating a method of acquiring system information according to another example.

FIG. 6 is a schematic flowchart illustrating a method of acquiring system information according to another example. As shown in FIG. 6, based on the example shown in FIG. 5, the method further includes the following steps.

At step S132, a second timing when the base station establishes the communication connection with the user equipment according to the connection request is recorded.

At step S133, it is determined whether the first radio resource control information is received within a second preset time period since the second timing.

At step S134, if the first radio resource control information is not received, second radio resource control information is transmitted to the base station, where the second radio resource control information includes second request information for requesting the system information.

In another example, when the communication connection is established between the base station and the user equipment according to the connection request, for example, when the user equipment receives information about confirming establishment of the communication connection from the base station, the user equipment may record a corresponding timing, that is, the second timing. The user equipment may further determine whether the first radio resource control information sent by the base station is received within the second preset time period since the second timing. If the first radio resource control information sent by the base station is not received, it may be determined that the base station did not send the first radio resource control information due a reason such as the base station was busy. Thus, the user equipment may transmit second radio resource control information carrying the second request information for requesting the system information, to ensure that the system information may be acquired timely.

Figure 7:
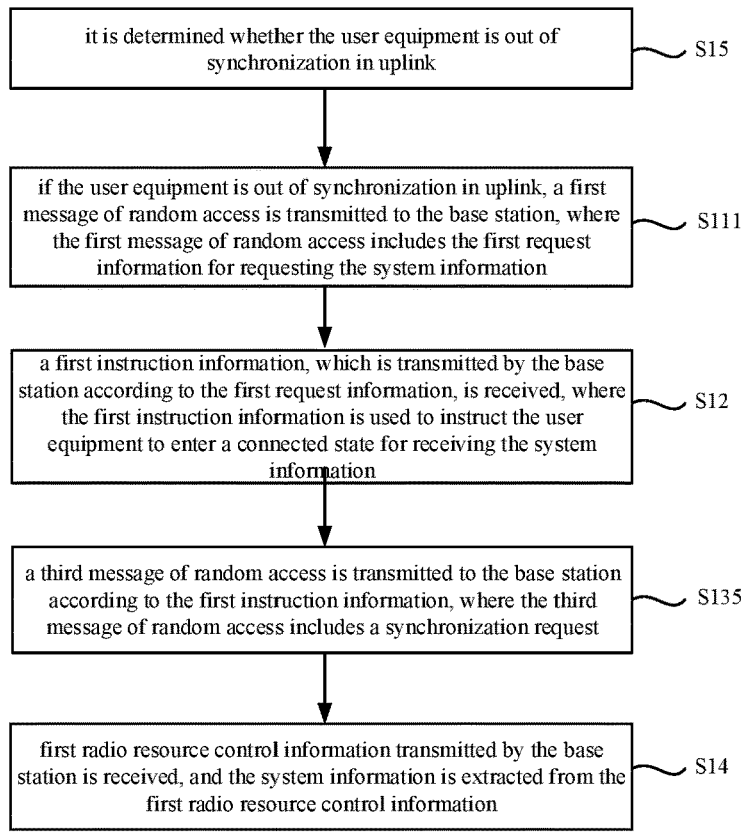
FIG. 7 is a schematic flowchart illustrating a method of acquiring system information according to another example.

FIG. 7 is a schematic flowchart illustrating a method of acquiring system information according to another example. As shown in FIG. 7, based on the example shown in FIG. 1, when the user equipment is in the connected state, before transmitting the message of random access to the base station, the method further includes the following step: at step S15, it is determined whether the user equipment is out of synchronization in uplink.

If the user equipment is out of synchronization in uplink: transmitting the message of random access to the base station includes: at step S111, a first message of random access is transmitted to the base station, where the first message of random access includes the first request information for requesting the system information; establishing the communication connection with the base station includes: at step S135, a third message of random access is transmitted to the base station according to the first instruction information, where the third message of random access includes a synchronization request.

In another example, for a user equipment that is already in a connected state, since the user equipment is already in the connected state, and the message of random access is generally used during a random access phase for interacting between the user equipment and the base station, the user equipment which is already in the connected state generally may not transmit the message of random access. While for the user equipment out of synchronization in uplink, since it loses synchronization when transmitting information to the base station, the user equipment may request synchronization by transmitting the message of random access to the base station, that is, for the user equipment in the connected state, when performing step S13, the user equipment may request synchronization by transmitting the message of random access to the base station, and then a synchronized communication connection is established with the base station.

When the user equipment in the connected state requests uplink synchronization from the base station through the message of random access, the user equipment may also request the system information from the base station, thereby eliminating the need to request the system information by sending an additional request to the base station, which is beneficial for reducing power consumption of the user equipment.

In another example, the message of random access is the third message of random access, and the third message of random access includes the first request information.

In another example, the third message of random access includes the request information and specific data of random access, and further includes the first request information.

Figure 8:
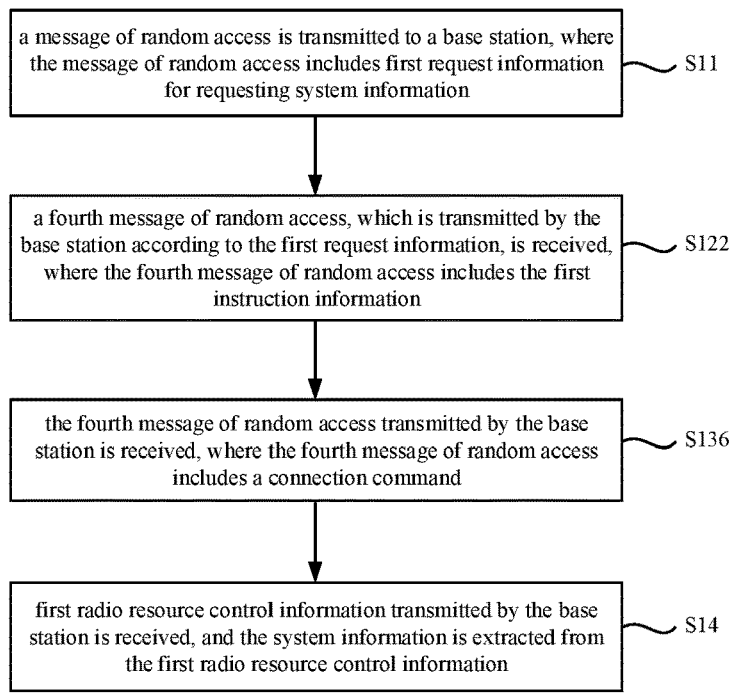
FIG. 8 is a schematic flowchart illustrating a method of acquiring system information according to another example.

FIG. 8 is a schematic flowchart illustrating a method of acquiring system information according to another example. As shown in FIG. 8, based on the example shown in FIG. 1, when the user equipment is in the non-connected state, receiving the first instruction information transmitted by the base station according to the first request information includes: at step S122, a fourth message of random access, which is transmitted by the base station according to the first request information, is received, where the fourth message of random access includes the first instruction information; establishing the communication connection with the base station includes: at step S136, the fourth message of random access transmitted by the base station is received, where the fourth message of random access includes a connection command.

The message of random access is sent in sequence between the user equipment and the base station, that is, after one side sends a n-th message of random access, the other side feeds back a (n+1)-th message of random access based on the n-th message, where n is an integer greater than 0. The number of messages of random access won't be too much, that is, the above-mentioned n will not be large, generally, n is less than or equal to 4. Thus, in another example, if the user equipment requests the system information from the base station through the third message of random access, after the base station receives the third message of random access and feeds back the fourth message of random access to the user equipment, the user equipment generally will not send any more messages of random access. At this time, the user equipment has not sent a request to the base station for establishing a communication connection with the base station. Therefore, the base station may send the connection command to the user equipment, where the connection command is carried in the fourth message, to ensure that the user equipment may establish the communication connection with the base station according to the connection command.

Figure 9:
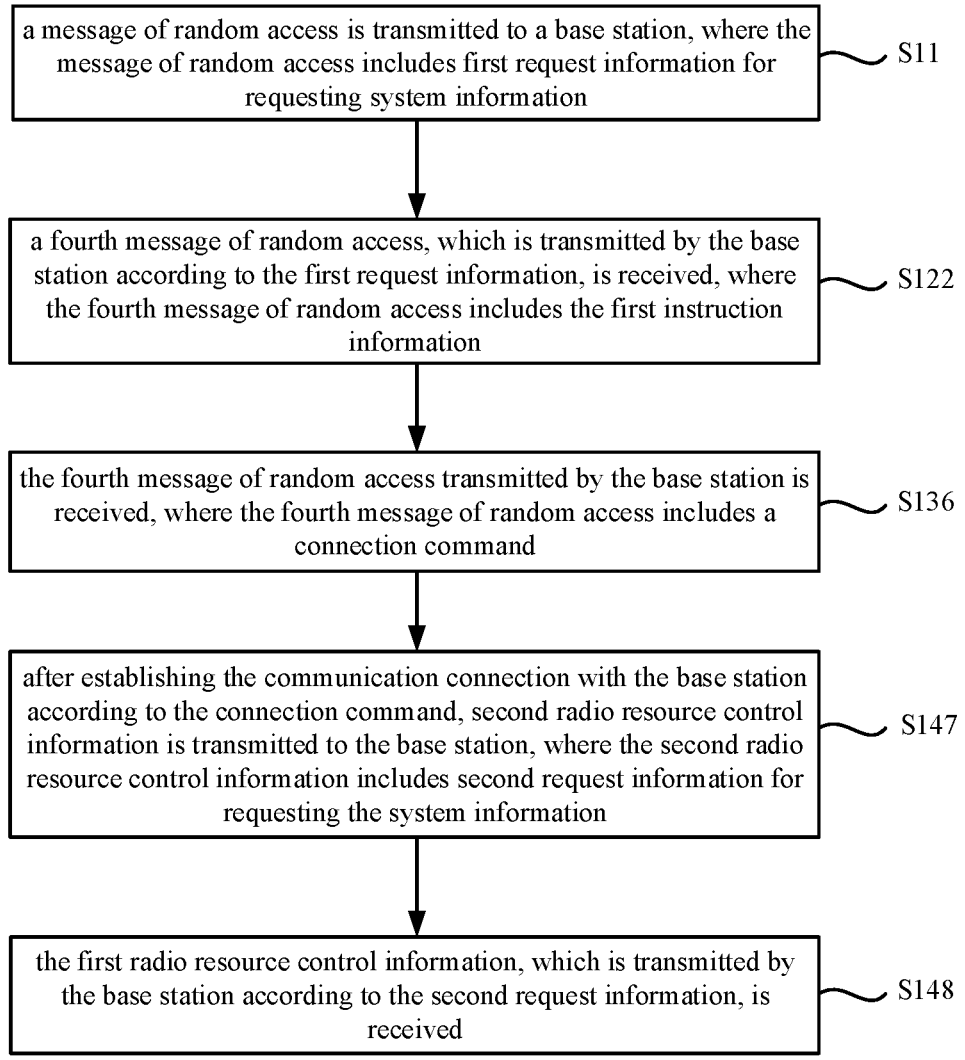
FIG. 9 is a schematic flowchart illustrating a method of acquiring system information according to another example.

FIG. 9 is a schematic flowchart illustrating a method of acquiring system information according to another example. As shown in FIG. 9, based on the example shown in FIG. 8, receiving the first radio resource control information transmitted by the base station includes the following steps.

At step S147, after establishing the communication connection with the base station according to the connection command, second radio resource control information is transmitted to the base station, where the second radio resource control information includes second request information for requesting the system information.

At step S148, the first radio resource control information, which is transmitted by the base station according to the second request information, is received.

In another example, after the base station establishes the communication connection with the user equipment according to the connection request, the user equipment enters the connected state. According to provisions of relevant protocols in 5G communication, for user equipment in the connection state, the system information may be requested through radio resource control information (specifically, it may be signaling). Therefore, after entering the connected state, the user equipment may be set to send the second radio resource control information carrying the second request information, to request the above system information, which ensures that the communication process meets the protocol requirements.

Figure 10:
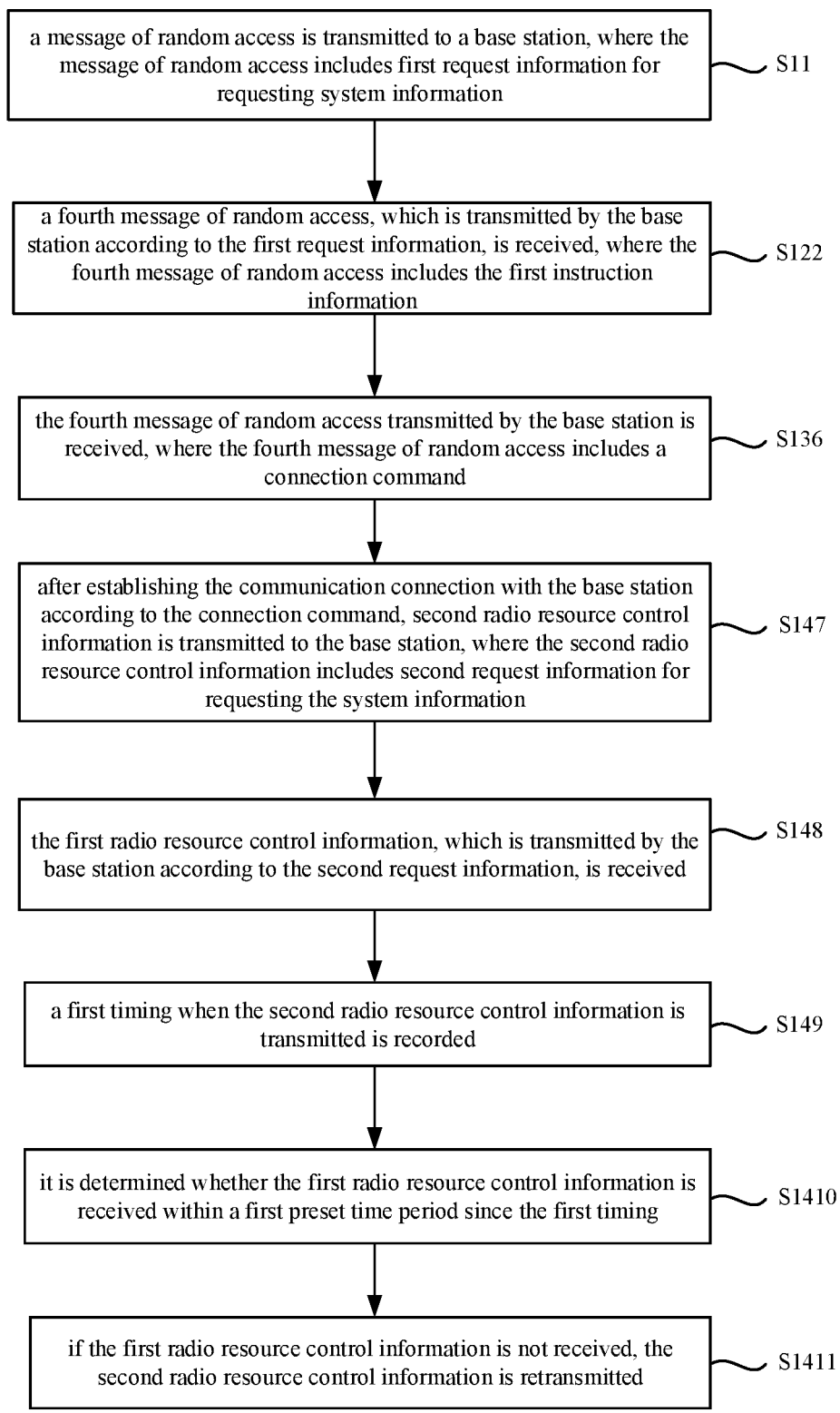
FIG. 10 is a schematic flowchart illustrating a method of acquiring system information according to another example.

FIG. 10 is a schematic flowchart illustrating a method of acquiring system information according to another example. As shown in FIG. 10, based on the example shown in FIG. 9, the method further includes the following steps.

At step S149, a first timing when the second radio resource control information is transmitted is recorded.

At step S1410, it is determined whether the first radio resource control information is received within a first preset time period since the first timing.

At step S1411, if the first radio resource control information is not received, the second radio resource control information is retransmitted.

In another example, when the user equipment transmits the second radio resource control information to the base station, the first timing when the user equipment performs this operation may be recorded, and it may be further determined whether the first radio resource control information is received within the first preset time period since the first timing. If the first radio resource control information sent by the base station is not received, it may be determined that the base station did not send the first radio resource control information due a reason such as the second radio resource control information did not arrived at the base station, the second radio resource control information was subjected to interference, the base station was busy, or the like. Thus, the user equipment may retransmit the second radio resource control information, to ensure that the system information may be acquired timely.

Figure 11:
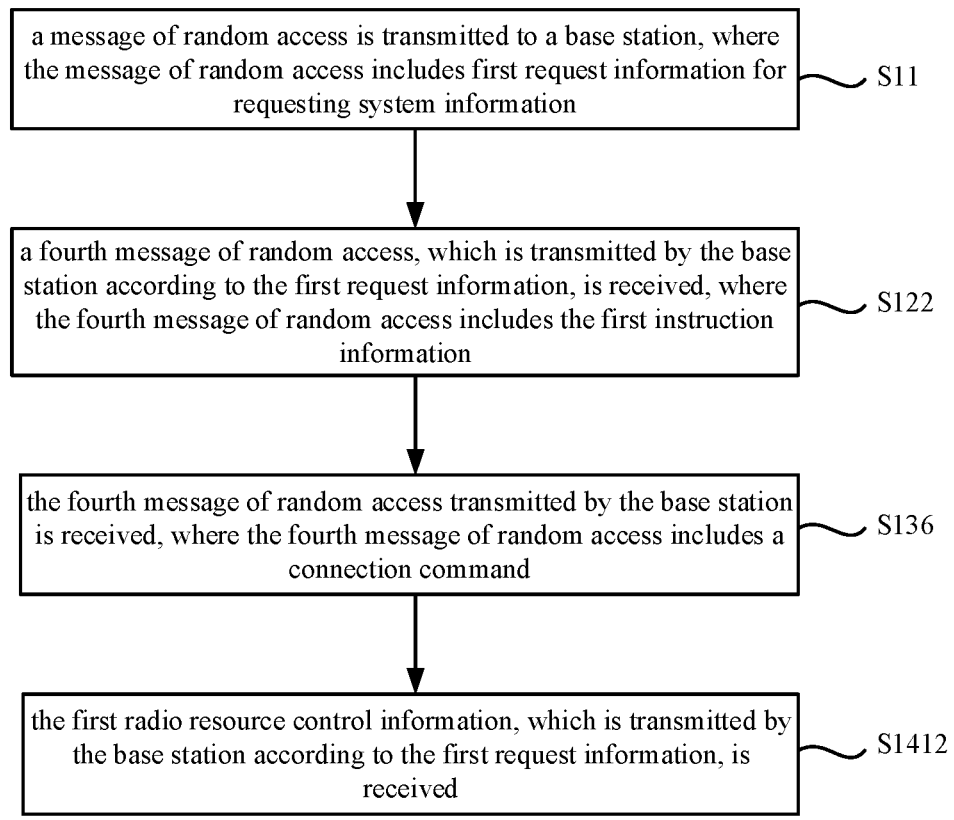
FIG. 11 is a schematic flowchart illustrating a method of acquiring system information according to another example.

FIG. 11 is a schematic flowchart illustrating a method of acquiring system information according to another example. As shown in FIG. 11, based on the example shown in FIG. 8, receiving the first radio resource control information transmitted by the base station includes: at step S1412, the first radio resource control information, which is transmitted by the base station according to the first request information, is received.

Based on the examples shown in FIG. 9 and FIG. 10, after the user equipment is in the communication connection with the base station, the user equipment acquires the system information by sending the second request information to the base station. In addition, based on the example of FIG. 11, after the user equipment is in the communication connection with the base station, the user equipment may wait for the base station to transmit the first radio resource control information carrying the system information according to the first request information. The specific receiving method may be selected according to actual needs.

Figure 12:
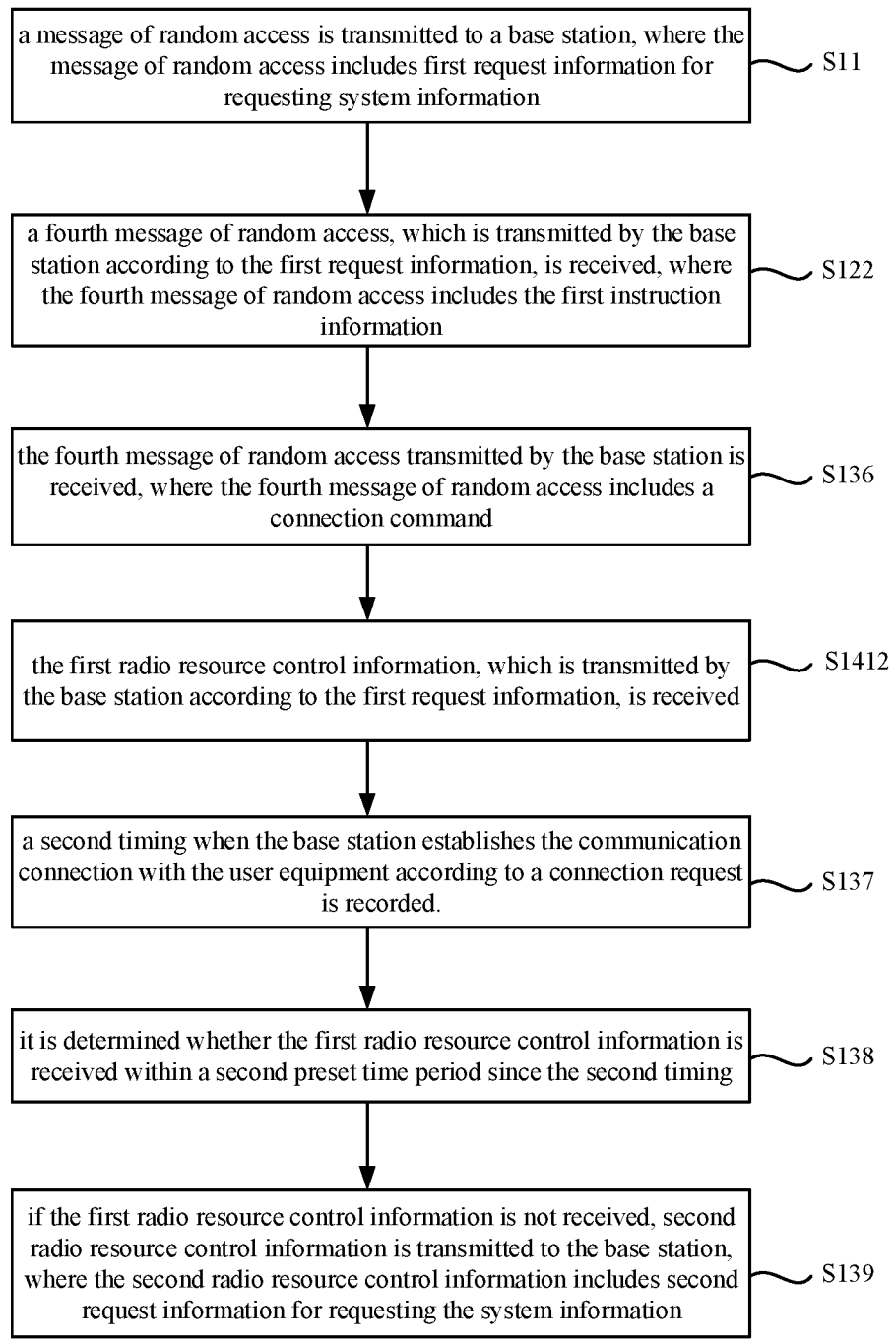
FIG. 12 is a schematic flowchart illustrating a method of acquiring system information according to another example.

FIG. 12 is a schematic flowchart illustrating a method of acquiring system information according to another example. As shown in FIG. 12, based on the example shown in FIG. 11, the method further includes the following steps.

At step S137, a second timing when the base station establishes the communication connection with the user equipment according to a connection request is recorded.

At step S138, it is determined whether the first radio resource control information is received within a second preset time period since the second timing.

At step S139, if the first radio resource control information is not received, second radio resource control information is transmitted to the base station, where the second radio resource control information includes second request information for requesting the system information.

In another example, when the communication connection is established between the base station and the user equipment according to the connection request, for example, when the user equipment receives information about confirming establishment of the communication connection from the base station, the user equipment may record a corresponding timing, that is, the second timing. The user equipment may further determine whether the first radio resource control information sent by the base station is received within the second preset time period since the second timing. If the first radio resource control information sent by the base station is not received, it may be determined that the base station did not send the first radio resource control information due a reason such as the base station was busy. Thus, the user equipment may transmit second radio resource control information carrying the second request information for requesting the system information, to ensure that the system information may be acquired timely.

Figure 13:
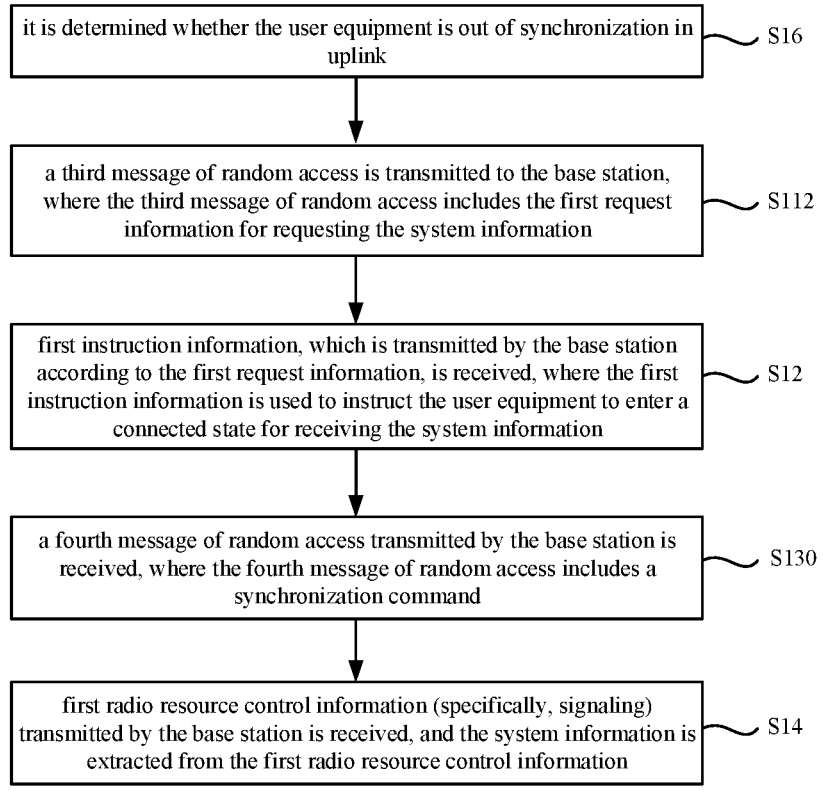
FIG. 13 is a schematic flowchart illustrating a method of acquiring system information according to another example.

FIG. 13 is a schematic flowchart illustrating a method of acquiring system information according to another example.

As shown in FIG. 13, based on the example shown in FIG. 1, when the user equipment is in the connected state, before transmitting the message of random access to the base station, the method further includes the following step: at step S16, it is determined whether the user equipment is out of synchronization in uplink.

If the user equipment is out of synchronization in uplink, transmitting the message of random access to the base station includes: at step S112, a third message of random access is transmitted to the base station, where the third message of random access includes the first request information for requesting the system information; establishing the communication connection with the base station includes: at step S130, a fourth message of random access transmitted by the base station is received, where the fourth message of random access includes a synchronization command.

In another example, for a user equipment that is already in a connected state, since the user equipment is already in the connected state, and the message of random access is generally used during a random access phase for interacting between the user equipment and the base station, the user equipment which is already in the connected state generally may not transmit the message of random access. While for the user equipment out of synchronization in uplink, since it loses synchronization when transmitting information to the base station, the user equipment may request synchronization by transmitting the message of random access to the base station.

However, when the user equipment carries the first request information through the third message of random access, based on the example shown in FIG. 8, after the base station feeds back the fourth message of random access to the user equipment upon receiving the third message of random access, the user equipment generally will not send any message of random access, so the base station may send a synchronization command to the user equipment. That is, for the user equipment in the connected state, when performing step S130, the user equipment may receive the fourth message of random access including the synchronization command transmitted by the base station, thereby synchronizing the communication connection with the base station.

Figure 14:
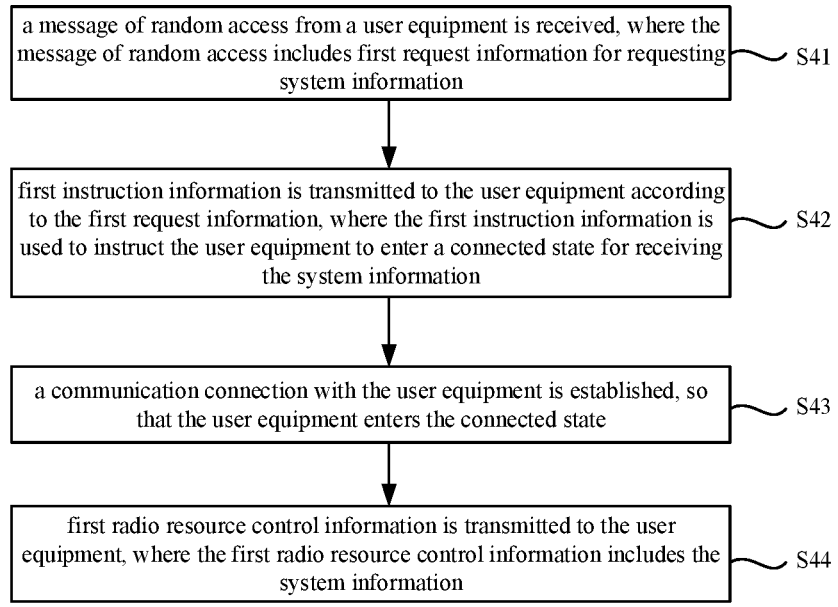
FIG. 14 is a schematic flowchart illustrating a method of transmitting system information according to another example.

FIG. 14 is a schematic flowchart illustrating a method of transmitting system information according to another example. The method of acquiring system information shown in this example may be applicable to a base station, such as a 5G base station.

As shown in FIG. 14, the method of transmitting system information in this example may include the following steps.

At step S41, a message of random access from a user equipment is received, where the message of random access includes first request information for requesting system information.

At step S42, first instruction information is transmitted to the user equipment according to the first request information, where the first instruction information is used to instruct the user equipment to enter a connected state for receiving the system information.

At step S43, a communication connection with the user equipment is established, so that the user equipment enters the connected state.

At step S44, first radio resource control information is transmitted to the user equipment, where the first radio resource control information includes the system information.

In another example, upon receiving the message of random access which includes the first request information for requesting the system information and is reported by the user equipment, the base station sends the first instruction information which instructs the user equipment to enter the connected state for receiving system information.

For a user equipment in a non-connected state, the user equipment may receive the first instruction information sent by the base station, and establish communication with the base station based on the first instruction information to enter the connected state. After the user equipment enters the connected state, information such as quality parameters of the downlink signal for the base station may be reported to the base station, so that the base station may accurately determine quality of a signal received by the user equipment, and properly adjust a beam signal sent to the user equipment. Thus, without occupying a lot of resources in the air interface, the system information requested by the user equipment may be transmitted to the user equipment.

For a user equipment in the connected state, when it requests uplink synchronization from the base station through the message of random access, the user equipment may also request the system information from the base station at the same time, thereby eliminating the need to request the system information by sending an additional request to the base station, which is beneficial for reducing power consumption of the user equipment.

Figure 15:
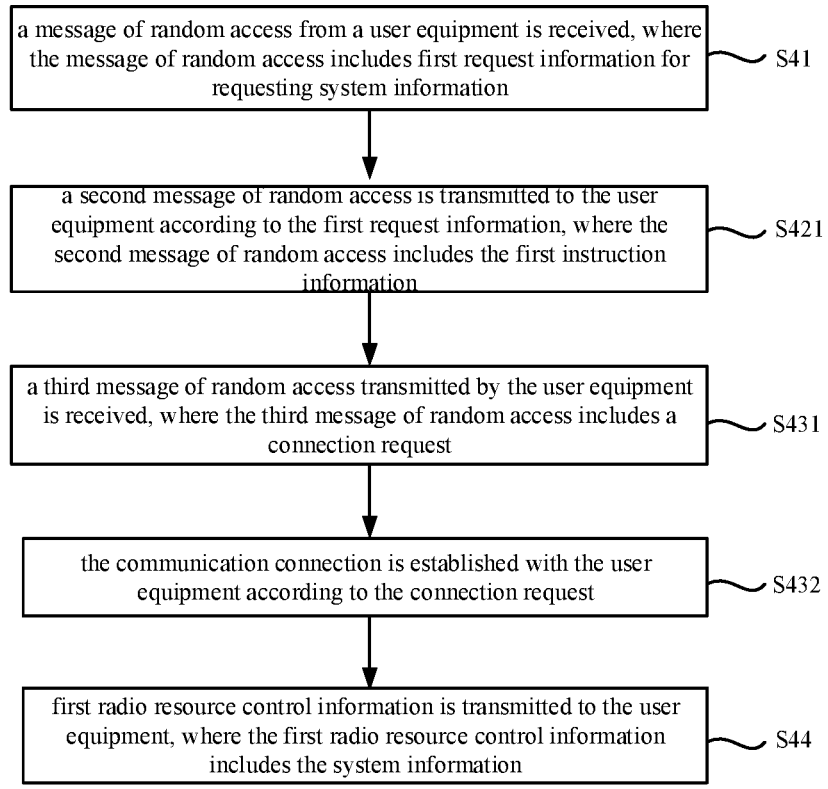
FIG. 15 is a schematic flowchart illustrating a method of transmitting system information according to another example.

FIG. 15 is a schematic flowchart illustrating another method of transmitting system information according to another example. As shown in FIG. 15, based on the example shown in FIG. 14, if the message of random access is a first message of random access, transmitting the first instruction information to the user equipment according to the first request information includes: at step S421, a second message of random access is transmitted to the user equipment according to the first request information, where the second message of random access includes the first instruction information; establishing the communication connection with the user equipment includes: at step S431, a third message of random access transmitted by the user equipment is received, where the third message of random access includes a connection request, and at step S432, the communication connection is established with the user equipment according to the connection request.

In another example, upon receiving the second message of random access sent by the base station, the user equipment may send the third message of random access to the base station, where the third message of random access carries the connection request. Therefore, the user equipment does not need to send a connection request separately, which is beneficial for reducing the power consumption of the user equipment.

Figure 16:
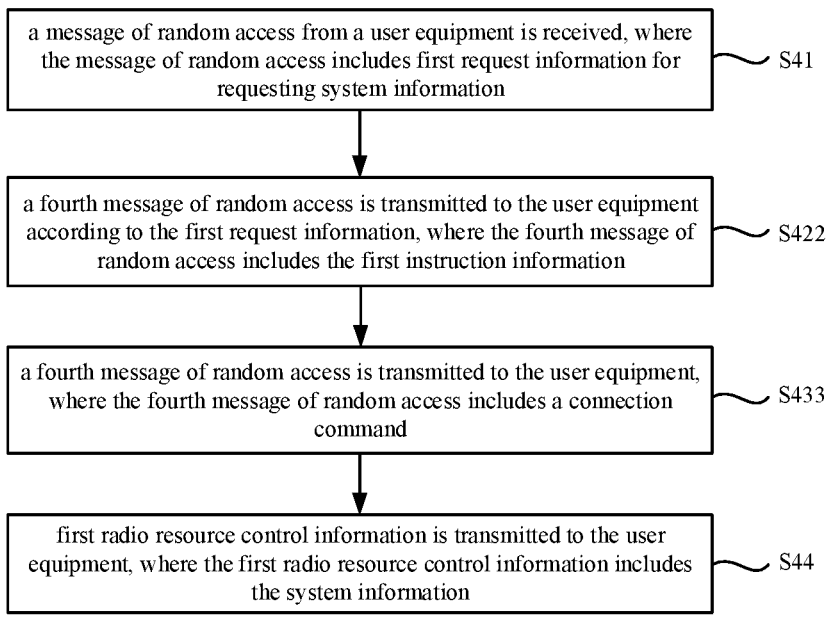
FIG. 16 is a schematic flowchart illustrating a method of transmitting system information according to another example.

FIG. 16 is a schematic flowchart illustrating a method of transmitting system information according to another example. As shown in FIG. 16, based on the example shown in FIG. 14, if the message of random access is a third message of random access, transmitting the first instruction information to the user equipment according to the first request information includes: at step S422, a fourth message of random access is transmitted to the user equipment according to the first request information, where the fourth message of random access includes the first instruction information; establishing the communication connection with the user equipment includes: at step S433, a fourth message of random access is transmitted to the user equipment, where the fourth message of random access includes a connection command.

Corresponding to the above examples of the methods of acquiring system information and the methods of transmitting system information, the present disclosure also provides examples of an apparatus for acquiring system information and an apparatus for transmitting system information.

Figure 17:
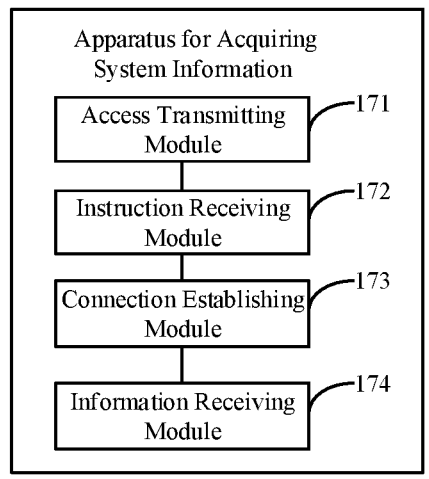
FIG. 17 is a schematic block diagram illustrating an apparatus for acquiring system information according to another example.

FIG. 17 is a schematic block diagram illustrating an apparatus for acquiring system information according to another example. As shown in FIG. 17, the apparatus includes:

an access transmitting module 171 configured to transmit a message of random access to a base station, where the message of random access includes first request information for requesting the system information;

an instruction receiving module 172 configured to receive first instruction information, which is transmitted by the base station according to the first request information, where the first instruction information instructs the user equipment to enter a connected state for receiving the system information;

a connection establishing module 173 configured to establish a communication connection with the base station; and an information receiving module 174 configured to receive first radio resource control information transmitted by the base station, and extract the system information from the first radio resource control information.

In another example, the message of random access is a first message of random access, and the first message of random access includes the first request information.

In another example, when the user equipment is in a non-connected state, the instruction receiving module is configured to receive a second message of random access, which is transmitted by the base station according to the first request information, where the second message of random access includes the first instruction information; and the connection establishing module 173 is configured to transmit a third message of random access to the base station according to the first instruction information, where the third message of random access includes a connection request.

Figure 18:
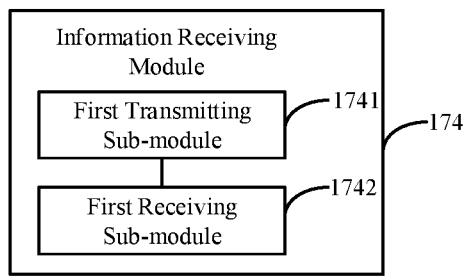
FIG. 18 is a schematic block diagram illustrating an information receiving module according to another example.

FIG. 18 is a schematic block diagram illustrating an information receiving module according to another example. As shown in FIG. 18, the information receiving module 174 includes:

a first transmitting sub-module 1741 configured to, after the base station establishes the communication connection with the user equipment according to the connection request, transmit second radio resource control information to the base station, where the second radio resource control information includes second request information for requesting the system information; and a first receiving sub-module 1742 configured to receive the first radio resource control information, which is transmitted by the base station according to the second request information.

Figure 19:
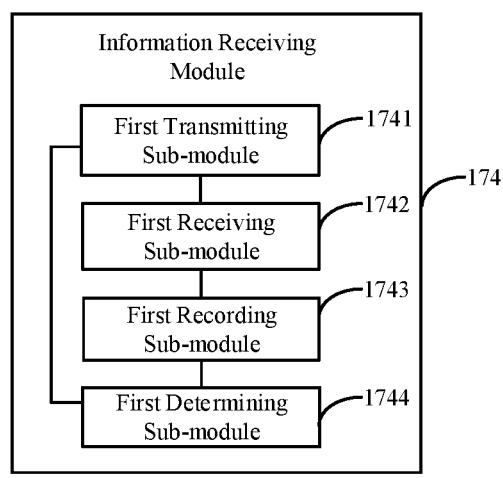
FIG. 19 is a schematic block diagram illustrating an information receiving module according to another example.

FIG. 19 is a schematic block diagram illustrating an information receiving module according to another example. As shown in FIG. 19, based on the example shown in FIG. 18, the information receiving module further includes:

a first recording sub-module 1743 configured to record a first timing when the second radio resource control information is transmitted; and a first determining sub-module 1744 configured to determine whether the first radio resource control information is received within a first preset time period since the first timing.

The first transmitting sub-module 1741 is further configured to, if the first determining sub-module 1744 determines that the first radio resource control information is not received within the first preset time period since the first timing, retransmit the second radio resource control information.

In another example, the information receiving module is configured to receive the first radio resource control information, which is transmitted by the base station according to the first request information.

Figure 20:
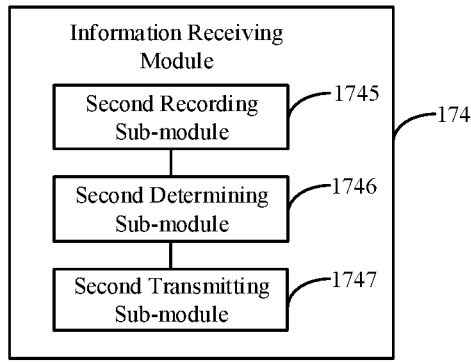
FIG. 20 is a schematic block diagram illustrating an information receiving module according to another example.

FIG. 20 is a schematic block diagram illustrating an information receiving module according to another example. As shown in FIG. 20, the information receiving module 174 includes:

a second recording sub-module 1745 configured to record a second timing when the base station establishes the communication connection with the user equipment according to the connection request;

a second determining sub-module 1746 configured to determine whether the first radio resource control information is received within a second preset time period since the second timing; and a second transmitting sub-module 1747 configured to, if the second determining sub-module 1746 determines that the first radio resource control information is not received within the second preset time period since the second timing, transmit second radio resource control information to the base station, where the second radio resource control information includes second request information for requesting the system information.

Figure 21:
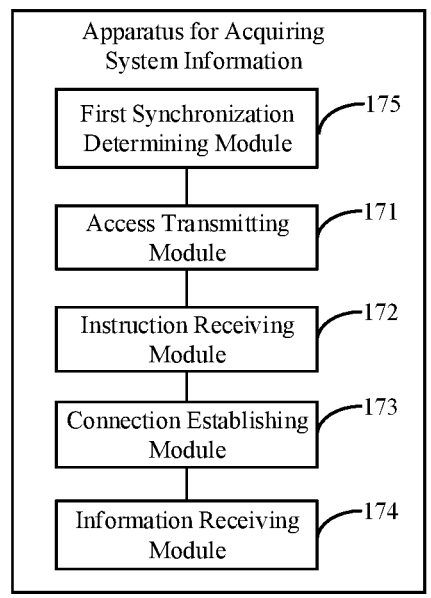
FIG. 21 is a schematic block diagram illustrating an apparatus for acquiring system information according to another example.

FIG. 21 is a schematic block diagram illustrating an apparatus for acquiring system information according to another example. When the user equipment is in the connected state, as shown in FIG. 21, the apparatus further includes:

a first synchronization determining module 175 configured to, before the access transmitting module transmits the message of random access to the base station, determine whether the user equipment is out of synchronization in uplink.

If the user equipment is out of synchronization in uplink, the access transmitting module 171 is configured to transmit the first message of random access to the base station, where the first message of random access includes the first request information for requesting the system information; and the connection establishing module 173 is configured to transmit a third message of random access to the base station according to the first instruction information, where the third message of random access includes a synchronization request.

In another example, the message of random access is a third message of random access, and the third message of random access includes the first request information.

In another example, when the user equipment is in a non-connected state, the instruction receiving module is configured to receive a fourth message of random access, which is transmitted by the base station according to the first request information, where the fourth message of random access includes the first instruction information; and the connection establishing module 173 is configured to receive the fourth message of random access transmitted by the base station, where the fourth message of random access includes a connection command.

Figure 22:
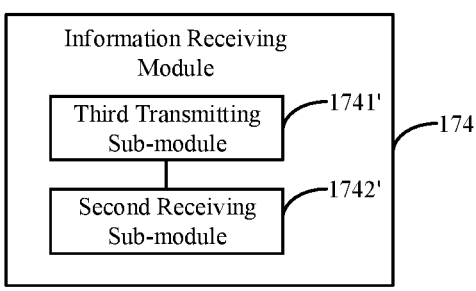
FIG. 22 is a schematic block diagram illustrating an information receiving module according to another example.

FIG. 22 is a schematic block diagram illustrating an information receiving module according to another example. As shown in FIG. 22, the information receiving module 174 includes:

a third transmitting sub-module 1741' configured to, upon establishing the communication connection with the base station according to the connection command, transmit second radio resource control information to the base station, where the second radio resource control information includes second request information for requesting the system information; and a second receiving sub-module 1742' configured to receive the first radio resource control information, which is transmitted by the base station according to the second request information.

Figure 23:
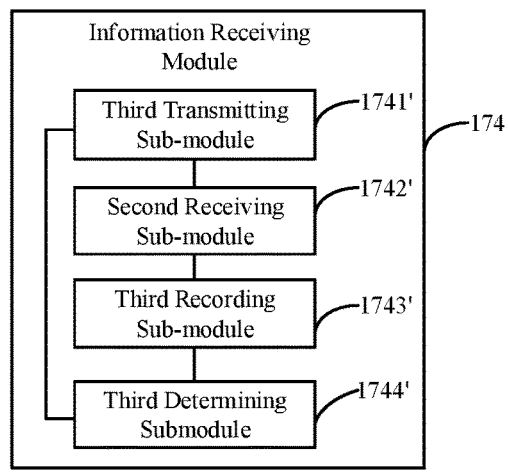
FIG. 23 is a schematic block diagram illustrating an information receiving module according to another example.

FIG. 23 is a schematic block diagram illustrating an information receiving module according to another example. As shown in FIG. 23, based on the example shown in FIG. 22, the information receiving module 174 further includes:

a third recording sub-module 1743' configured to record a first timing when the second radio resource control information is transmitted; and a third determining sub-module 1744' configured to determine whether the first radio resource control information is received within a first preset time period since the first timing.

The third transmitting sub-module 1741' is configured to, if the third determining sub-module 1744' determines that the first radio resource control information is not received within the first preset time period since the first timing, retransmit the second radio resource control information.

In another example, the information receiving module is configured to receive the first radio resource control information, which is transmitted by the base station according to the first request information.

Figure 24:
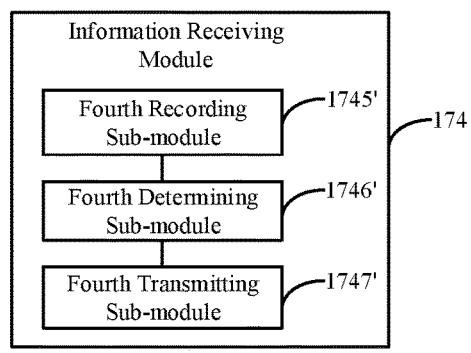
FIG. 24 is a schematic block diagram illustrating an information receiving module according to another example.

FIG. 24 is a schematic block diagram illustrating an information receiving module according to another example. As shown in FIG. 24, the information receiving module 174 includes:

a fourth recording sub-module 1745' configured to record a second timing when the base station establishes the communication connection with the user equipment according to a connection request;

a fourth determining sub-module 1746' configured to determine whether the first radio resource control information is received within a second preset time period since the second timing; and a fourth transmitting sub-module 1747' configured to, if the fourth determining sub-module 1746' determines that the first radio resource control information is not received within the second preset time period since the second timing, transmit second radio resource control information to the base station, where the second radio resource control information includes a second request information for requesting the system information.

Figure 25:
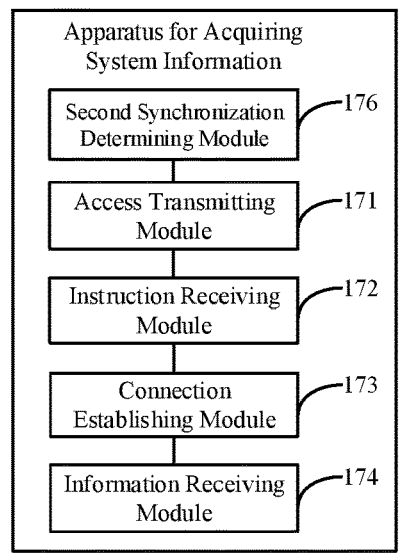
FIG. 25 is a schematic block diagram illustrating an apparatus for acquiring system information according to another example.

FIG. 25 is a schematic block diagram illustrating an apparatus for acquiring system information according to another example. When the user equipment is in the connected state, the apparatus further includes: a second synchronization determining module 176 configured to, before the access transmitting module transmits the message of random access to the base station, determine whether the user equipment is out of synchronization in uplink.

If the user equipment is out of synchronization in uplink, the access transmitting module 171 is configured to transmit the third message of random access to the base station, where the third message of random access includes the first request information for requesting the system information; and the connection establishing module 173 is configured to receive a fourth message of random access transmitted by the base station, where the fourth message of random access includes a synchronization command.

Figure 26:
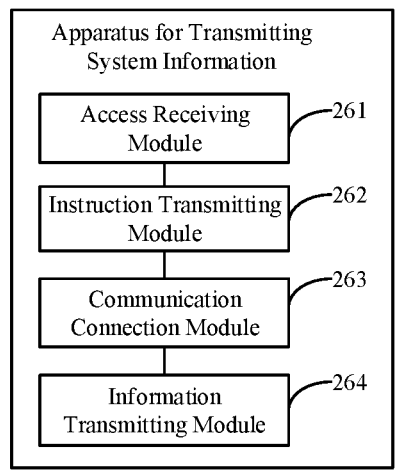
FIG. 26 is a schematic block diagram illustrating an apparatus for transmitting system information according to another example.

FIG. 26 is a schematic block diagram illustrating an apparatus for transmitting system information according to another example. As shown in FIG. 26, the apparatus includes:

an access receiving module 261 configured to receive a message of random access from a user equipment, where the message of random access includes first request information for requesting the system information;

an instruction transmitting module 262 configured to transmit first instruction information to the user equipment according to the first request information, where the first instruction information instructs the user equipment to enter a connected state for receiving the system information;

a communication connection module 263 configured to establish a communication connection with the user equipment, so that the user equipment enters the connected state; and an information transmitting module 264 configured to transmit first radio resource control information to the user equipment, where the first radio resource control information includes the system information.

In another example, when the message of random access is a first message of random access, the instruction transmitting module is configured to transmit a second message of random access to the user equipment according to the first request information, where the second message of random access includes the first instruction information; and the communication connection module is configured to receive a third message of random access transmitted by the user equipment, where the third message of random access includes a connection request; and establish the communication connection with the user equipment according to the connection request.

In another example, when the message of random access is a third message of random access, the instruction transmitting module is configured to transmit a fourth message of random access to the user equipment according to the first request information, where the fourth message of random access includes the first instruction information; and the communication connection module is configured to transmit the fourth message of random access to the user equipment, where the fourth message of random access includes a connection command.

Regarding the apparatuses in the above examples, the specific manners in which each module performs operations has been described in detail in the examples of the related methods, which will not be described in detail here.

As for the apparatus examples, since they basically correspond to the method examples, the relevant part may refer to the description of the method examples. The apparatus examples described above are only schematic, and the modules described as separate components may or may not be physically separated, and the components displayed as modules may or may not be physical modules, that is, may be located in one place, or may be distributed to multiple network modules. Some or all of the modules can be selected according to actual needs to achieve the objectives of the solution of the present disclosure. It can be understood and implemented by those of ordinary skill in the art without any creative effort.

In another example, a user equipment is also provided by the present disclosure, including: one or more processors; a non-transitory storage coupled to the one or more processors, and a plurality of programs stored in the non-transitory storage that, when executed by the one or more processors, cause the user equipment to perform acts comprising: transmitting a message of random access to a base station, where the message of random access includes first request information for requesting system information; receiving first instruction information, which is transmitted by the base station according to the first request information, where the first instruction information instructs the user equipment to enter a connected state for receiving the system information; establishing a communication connection with the base station; and receiving first radio resource control information transmitted by the base station, and extracting the system information from the first radio resource control information.

In another example, a base station is also provided by the present disclosure, including: one or more processors; a non-transitory storage coupled to the one or more processors, and a plurality of programs stored in the non-transitory storage that, when executed by the one or more processors, cause the base station to perform acts comprising: receiving a message of random access from a user equipment, where the message of random access includes first request information for requesting system information; transmitting first instruction information to the user equipment according to the first request information, where the first instruction information instructs the user equipment to enter a connected state for receiving the system information; establishing a communication connection with the user equipment, so that the user equipment enters the connected state; and transmitting first radio resource control information to the user equipment, where the first radio resource control information includes the system information.

In another example, a computer-readable storage medium is also provided by the present disclosure, which stores a computer program that, when executed by a processor, implements steps of: transmitting a message of random access to a base station, where the message of random access includes first request information for requesting system information; receiving first instruction information, which is transmitted by the base station according to the first request information, where the first instruction information instructs a user equipment to enter a connected state for receiving the system information; establishing a communication connection with the base station; and receiving first radio resource control information transmitted by the base station, and extracting the system information from the first radio resource control information.

In another example, a computer-readable storage medium is also provided by the present disclosure, which stores a computer program that, when executed by a processor, implements steps of: receiving a message of random access from a user equipment, where the message of random access includes first request information for requesting system information; transmitting first instruction information to the user equipment according to the first request information, where the first instruction information instructs the user equipment to enter a connected state for receiving the system information; establishing a communication connection with the user equipment, so that the user equipment enters the connected state; and transmitting first radio resource control information to the user equipment, where the first radio resource control information includes the system information.

Figure 27:
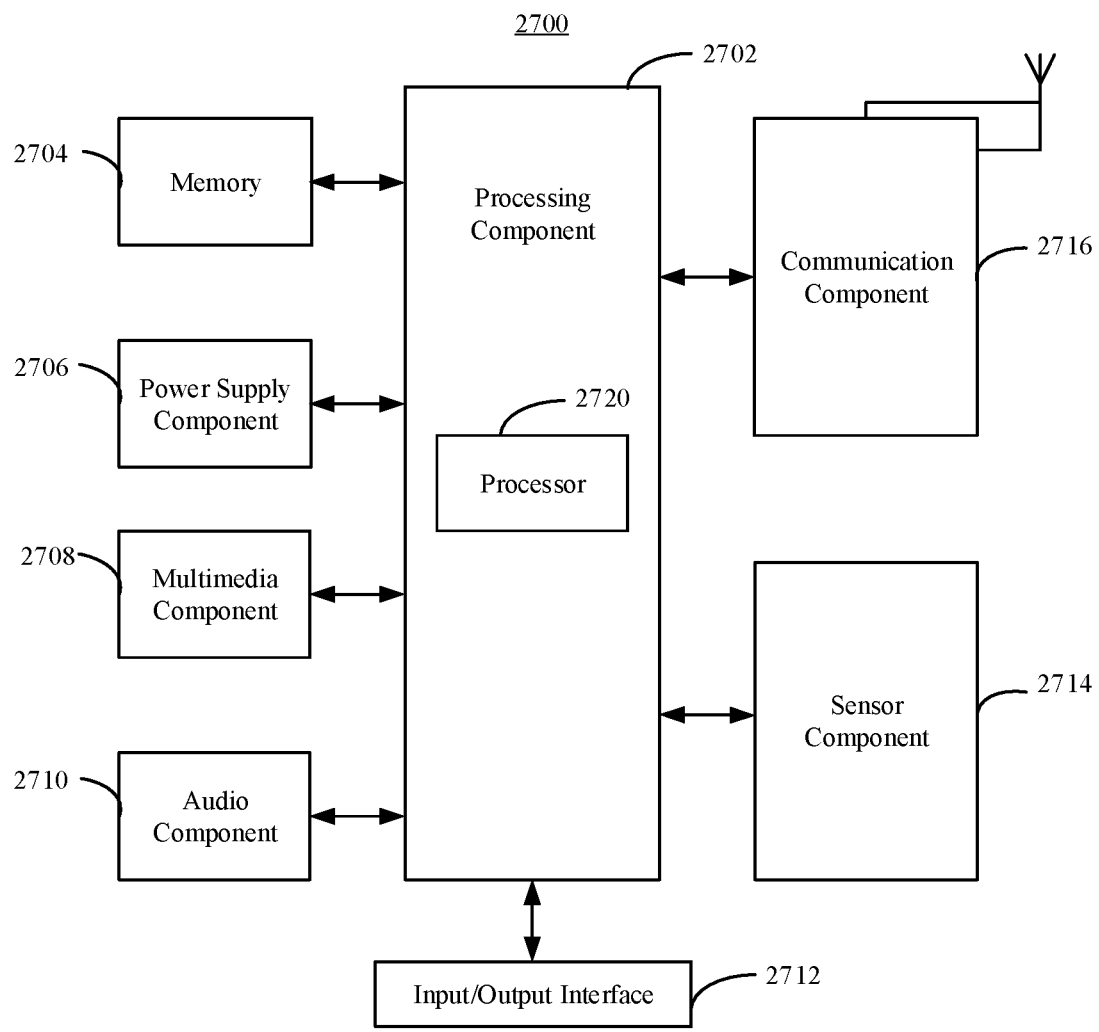
FIG. 27 is a schematic block diagram illustrating an apparatus for acquiring system information according to another example.

FIG. 27 is a schematic block diagram illustrating an apparatus 2700 for acquiring system information according to another example. For example, the apparatus 2700 may be a mobile phone, a computer, a digital broadcast terminal, a messaging device, a game console, a tablet device, a medical device, a fitness device, a personal digital assistant, and the like.

As shown in FIG. 27, the apparatus 2700 may include one or more of the following components: a processing component 2702, a memory 2704, a power supply component 2706, a multimedia component 2708, an audio component 2710, an input/output (I/O) interface 2712, a sensor component 2714, and a communication component 2716.

The processing component 2702 generally controls overall operations of the apparatus 2700, such as operations associated with display, phone calls, data communications, camera operations, and recording operations. The processing component 2702 may include one or more processors 2720 to execute instructions to complete all or part of the steps of the above methods. In addition, the processing component 2702 may include one or more modules which facilitate the interaction between the processing component 2702 and other components. For example, the processing component 2702 may include a multimedia module to facilitate the interaction between the multimedia component 2708 and the processing component 2702.

The memory 2704 is to store various types of data to support the operation of the apparatus 2700. Examples of such data include instructions for any application or method operated on the apparatus 2700, contact data, telephone directory data, messages, pictures, video and so on. The memory 2704 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2706 supplies power for different components of the apparatus 2700. The power supply component 2706 may include a power supply management system, one or more power supplies, and other components associated with generating, managing and distributing power for the apparatus 2700.

The multimedia component 2708 includes a screen providing an output interface between the apparatus 2700 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 2708 may include a front camera and/or a rear camera. The front camera and/or rear camera may receive external multimedia data when the apparatus 2700 is in an operating mode, such as a photographing mode or a video mode. Each of the front camera and the rear camera may be a fixed optical lens system or have focal length and optical zooming capability.

The audio component 2710 is to output and/or input an audio signal. For example, the audio component 2710 includes a microphone (MIC). When the apparatus 2700 is in an operating mode, such as a call mode, a record mode and a voice recognition mode, the microphone is to receive an external audio signal. The received audio signal may be further stored in the memory 2704 or sent via the communication component 2716. In some examples, the audio component 2710 further includes a speaker for outputting an audio signal.

The I/O interface 2712 provides an interface between the processing component 2702 and a peripheral interface module. The above peripheral interface module may be a keyboard, a click wheel, buttons, or the like. These buttons may include but not limited to, a home button, a volume button, a start button and a lock button.

The sensor component 2714 includes one or more sensors to provide status assessments of various aspects for the apparatus 2700. For example, the sensor component 2714 may detect the on/off status of the apparatus 2700, and relative positioning of component, for example, the component is a display and a keypad of the apparatus 2700. The sensor component 2714 may also detect a change in position of the apparatus 2700 or a component of the apparatus 2700, a presence or absence of the contact between a user and the apparatus 2700, an orientation or an acceleration/deceleration of the apparatus 2700, and a change in temperature of the apparatus 2700. The sensor component 2714 may include a proximity sensor to detect the presence of a nearby object without any physical contact. The sensor component 2714 may further include an optical sensor, such as a Complementary Metal-Oxide-Semiconductor (CMOS) or Charged Coupled Device (CCD) image sensor which is used in imaging applications. In some examples, the sensor component 2714 may further include an acceleration sensor, a gyroscope sensor, a magnetic sensor, a pressure sensor, or a temperature sensor.

The communication component 2716 is to facilitate wired or wireless communication between the apparatus 2700 and other devices. The apparatus 2700 may access a wireless network based on a communication standard, such as Wi-Fi, 2G or 3G, or a combination thereof. In another example, the communication component 2716 receives a broadcast signal or broadcast related information from an external broadcast management system via a broadcast channel. In another example, the communication component 2716 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In another example, the apparatus 2700 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the method of acquiring system information described in any one of the above examples.

In another example, there is further provided a non-transitory computer readable storage medium including instructions, such as the memory 2704 including instructions. The above instructions may be executed by the processor 2720 of the apparatus 2700 to complete the above method. For example, the non-transitory computer readable storage medium may be a Read-Only Memory (ROM), a Random Access Memory (RAM), a CD-ROM, a magnetic tape, a floppy disk, an optical data storage device, and so on.

Figure 28:
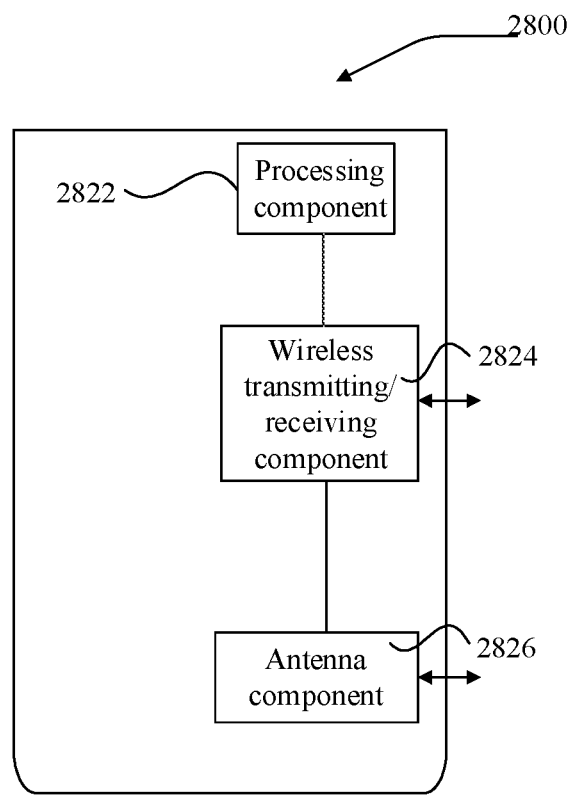
FIG. 28 is a schematic block diagram illustrating an apparatus for transmitting system information according to another example.

As shown in FIG. 28, FIG. 28 is a schematic block diagram illustrating an apparatus 2800 for transmitting system information according to another example. The apparatus 2800 can be provided as a bases station. Referring to FIG. 28, the apparatus 2800 includes a processing component 2822, a wireless transmitting/receiving component 2824, an antenna component 2826, and a signal processing portion dedicated to the wireless interface. The processing component 2822 may further include one or more processors. One of the processors in the processing component 2822 may be configured to execute the method of transmitting system message described in any one of the above examples.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

Other examples of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of acquiring system information applied to a user equipment, comprising:
    transmitting a message of random access to a base station, wherein the message of random access comprises first request information for requesting the system information, wherein the message of random access comprises a first message of random access, and the first message of random access comprises the first request information;
    receiving first instruction information transmitted by the base station according to the first request information, wherein the first instruction information instructs the user equipment to enter a connected state for receiving the system information, wherein when the user equipment is in a non-connected state, receiving the first instruction information transmitted by the base station according to the first request information comprises:
    receiving a second message of random access transmitted by the base station according to the first request information, wherein the second message of random access comprises the first instruction information;
    establishing a communication connection with the base station, wherein when the user equipment is in a non-connected state, establishing the communication connection with the base station comprises:

transmitting a third message of random access to the base station according to the first instruction information, wherein the third message of random access comprises a connection request; and
receiving first radio resource control information transmitted by the base station, and extracting the system information from the first radio resource control information.

2. The method according to claim 1, wherein receiving the first radio resource control information transmitted by the base station comprises:
after the base station establishes the communication connection with the user equipment according to the connection request, transmitting second radio resource control information to the base station, wherein the second radio resource control information comprises second request information for requesting the system information; and
receiving the first radio resource control information transmitted by the base station according to the second request information.

3. The method according to claim 2, further comprising:
recording a first timing when the second radio resource control information is transmitted;
determining whether the first radio resource control information is received within a first preset time period since the first timing; and
when the first radio resource control information is not received, retransmitting the second radio resource control information.

4. The method according to claim 1, wherein receiving the first radio resource control information transmitted by the base station comprises:
receiving the first radio resource control information transmitted by the base station according to the first request information.

5. The method according to claim 4, further comprising:
recording a second timing when the base station establishes the communication connection with the user equipment according to the connection request;
determining whether the first radio resource control information is received within a second preset time period since the second timing; and
when the first radio resource control information is not received, transmitting second radio resource control information to the base station, wherein the second radio resource control information comprises second request information for requesting the system information.

6. A method of transmitting system information, comprising:
receiving a message of random access from a user equipment, wherein the message of random access comprises first request information for requesting the system information, wherein the message of random access comprises a first message of random access;
transmitting first instruction information to the user equipment according to the first request information, wherein the first instruction information instructs the user equipment to enter a connected state for receiving the system information, wherein when the message of random access is the first message of random access, transmitting the first instruction information to the user equipment according to the first request information comprises:
transmitting a second message of random access to the user equipment according to the first request information, wherein the second message of random access comprises the first instruction information;
establishing a communication connection with the user equipment so that the user equipment enters the connected state, wherein when the message of random access is the first message of random access, establishing the communication connection with the user equipment comprises:
receiving a third message of random access transmitted by the user equipment, wherein the third message of random access comprises a connection request; and
establishing the communication connection with the user equipment according to the connection request; and
transmitting first radio resource control information to the user equipment, wherein the first radio resource control information comprises the system information.

7. A user equipment, comprising:
one or more processors;
a non-transitory storage coupled to the one or more processors; and
a plurality of programs stored in the non-transitory storage that, when executed by the one or more processors, cause the user equipment to perform acts comprising:
transmitting a message of random access to a base station, wherein the message of random access comprises first request information for requesting system information, wherein the message of random access comprises a first message of random access, and the first message of random access comprises the first request information;
receiving first instruction information transmitted by the base station according to the first request information, wherein the first instruction information instructs the user equipment to enter a connected state for receiving the system information, wherein when the user equipment is in a non-connected state, receiving the first instruction information transmitted by the base station according to the first request information comprises:
receiving a second message of random access transmitted by the base station according to the first request information, wherein the second message of random access comprises the first instruction information;
establishing a communication connection with the base station, wherein when the user equipment is in a non-connected state, establishing the communication connection with the base station comprises:
transmitting a third message of random access to the base station according to the first instruction information, wherein the third message of random access comprises a connection request; and
receiving first radio resource control information transmitted by the base station, and extracting the system information from the first radio resource control information.

8. A base station, comprising:
one or more processors;
a non-transitory storage coupled to the one or more processors; and
a plurality of programs stored in the non-transitory storage that, when executed by the one or more processors, cause the base station to perform acts comprising:
receiving a message of random access from a user equipment, wherein the message of random access comprises first request information for requesting system information, wherein the message of random access comprises a first message of random access;
transmitting first instruction information to the user equipment according to the first request information, wherein the first instruction information instructs the user equipment to enter a connected state for receiving the system information, wherein when the message of random access is the first message of random access, transmitting the first instruction information to the user equipment according to the first request information comprises:

transmitting a second message of random access to the user equipment according to the first request information, wherein the second message of random access comprises the first instruction information;

establishing a communication connection with the user equipment so that the user equipment enters the connected state, wherein when the message of random access is the first message of random access, establishing the communication connection with the user equipment comprises:

receiving a third message of random access transmitted by the user equipment, wherein the third message of random access comprises a connection request; and establishing the communication connection with the user equipment according to the connection request; and transmitting first radio resource control information to the user equipment, wherein the first radio resource control information comprises the system information.

* * * * *